Patented Aug. 16, 1927.

1,639,186

UNITED STATES PATENT OFFICE.

MYRTIL KAHN, OF COLOGNE, AND RUDOLF MAYER, OF LEVERKUSEN, NEAR COLOGNE-ON-THE-RHINE, GERMANY, ASSIGNORS TO GRASSELLI DYESTUFF CORPORATION, OF NEW YORK, N. Y., A CORPORATION OF DELAWARE.

CATALYTIC REDUCTION OF ORGANIC NITRO COMPOUNDS.

No Drawing. Application filed August 14, 1926, Serial No. 129,290, and in Germany September 29, 1924.

Our invention consists in catalytically reducing organic nitro compounds to amino compounds by means of hydrogen and a catalyst and in the novel catalyst to be used for this reduction.

We have found that the nitro group of an organic nitro compound is reduced to the amino group when a mixture of the vaporized nitro compound and hydrogen gas is passed over silicagel at elevated temperatures. Silicagel is the more or less hydrated and colloidal silicium dioxid known commercially under this name.

Silicagel, however, is not a very powerful catalyst and the yields of amino compounds are rather small, when using silicagel in the hydrogenation of nitro compounds.

We have now further found that silicagel impregnated with the oxides of heavy metals, particularly iron, copper and nickel, is a much more powerful catalyst and allows of the production of the amino compounds in a very convenient and cheap manner. Only small amounts of the oxide or hydroxide have to be precipitated upon the silicagel to obtain the maximum effect. The metal oxide or hydroxide is reduced in the first stages of the reduction process and the reduced substances are presumably the active catalysts in the reduction. Other compounds of the heavy metals which are reduced when acted upon with hydrogen at elevated temperatures can likewise be used to produce the active catalysts. The fine particles of reduced metallic substance adhere firmly on the silicagel and the so prepared catalyst preserves its catalytic power for quite a long period.

The temperature range in which the reduction of the nitro compound to the amino compound proceeds smoothly and with the best yields is between about 150° and 300° C. The optimum conditions vary within that range for each particular nitro compound.

The reacting conditions can furthermore be modified to suit particular properties of the nitro compounds. In the case of high boiling products it might be preferred to carry out the reduction under subatmospheric pressures or with an increased excess of hydrogen, which can be circulated through the distilling, reducing and condensing system. Distilling the substance with superheated steam has also been found quite useful as a manner of introducing the nitro compound into the reduction system. Such special procedures are particularly applicable to the high boiling nitro naphthalenes and similar compounds.

Our novel reduction process is applicable as well to aliphatic, aromatic and heterocyclic nitro compounds. Substantially only the nitro group is reduced when submitting aromatic or similar ring structure compounds to the novel reduction process described herein.

The following examples will further illustrate our invention:

*Example 1.*—Nitrobenzene vapors, mixed with hydrogen are distilled into a tube containing silicagel upon which copper hydroxide has been precipitated and the tube with the catalyst is kept at a temperature of about 200° C. The copper hydroxide goes over into copper oxide and the copper compounds are reduced by the excess hydrogen to metallic copper which adheres firmly to the silicagel. The nitrobenzene is reduced to aniline which leaves together with excess hydrogen at the opposite end of the tube and is condensed. It is obtained with a very good yield.

Instead of using a silicagel upon which copper has been deposited a silicagel containing other heavy metals, particularly iron and nickel will give similar results.

*Example 2.*—O-toluidine, m-toluidine, p-toluidine are obtained from the respective nitrotoluenes in a similar manner with excellent purity and yield, the catalyst keeping its activity for a long time. It is advisable to reduce the nitrotoluenes at somewhat higher temperature; i. e., 220–225° C.

*Example 3.*—Alpha-nitro-naphthalene is distilled with superheated steam and the vapors mixed with hydrogen led over silicagel impregnated with copper and heated to about 240° C. Substantially pure alpha naphthylamine is obtained free from by-products.

*Example 4.*—Vapors of 3-nitro-pyridine mixed with hydrogen are led over a copper-silicagel catalyst heated to about 200–250° C. 3-amino-pyridine is obtained in substantially pure and crystalline form, melting at 63° C.

*Example 5.*—Nitro-methane and hydrogen are led over a copper-silicagel catalyst heated to about 180° C., it is reduced with an excellent yield to methylamine, which is substantially free from nitro-methane. It is absorbed in the usual way in water or transformed into its salts, for instance the hydrochloride.

We claim:

1. The process of reducing organic nitro compounds which consists in reacting upon same with hydrogen at elevated temperatures in presence of a reduction catalyst comprising silicagel.

2. The process of reducing organic nitro compounds which consists in reacting upon same with hydrogen at elevated temperatures in presence of a reduction catalyst consisting of silicagel impregnated with a reducible heavy metal compound.

3. The process of reducing organic nitro compounds which consists in reacting upon same with hydrogen at elevated temperatures in presence of a reduction catalyst consisting of silicagel impregnated with a reduced heavy metal oxide or hydroxide.

4. The process of reducing organic nitro compounds which consists in reacting upon same with hydrogen at elevated temperatures in presence of a reduction catalyst consisting of silicagel impregnated with a reducible compound of one of the metals of the group comprising iron, copper and nickel.

5. The process of reducing organic nitro compounds which consists in reacting upon same with hydrogen at elevated temperatures in presence of a reduction catalyst consisting of silicagel impregnated with a reduced oxide or hydroxide of one of the metals of the group comprising iron, copper and nickel.

6. The process of reducing organic nitro compounds which consists in reacting upon same with hydrogen at elevated temperatures in presence of a reduction catalyst consisting of silicagel impregnated with a reducible copper compound.

7. The process of reducing organic nitro compounds which consists in reacting upon same with hydrogen at elevated temperatures in presence of a reduction catalyst consisting of silicagel impregnated with a reduced copper oxide or hydroxide.

8. The process of reducing organic nitro compounds which consists in reacting upon same with hydrogen at temperatures of about 150–300° C. in presence of a reduction catalyst consisting of silicagel impregnated with a reducible copper compound.

9. The process of reducing organic nitro compounds which consists in reacting upon same with hydrogen at temperatures of about 150–300° C. in presence of a reduction catalyst consisting of silicagel impregnated with reduced copper oxide or hydroxide.

In testimony whereof, we affix our signatures.

MYRTIL KAHN.
RUDOLF MAYER.